United States Patent
Tateno

Patent Number: 5,150,294
Date of Patent: Sep. 22, 1992

[54] PLURAL DICTIONARY APPARATUS WITH AUTOMATIC RETRIEVAL FROM MORE THAN ONE PLUG-IN IC DICTIONARY CARD

[75] Inventor: Masakazu Tateno, Tokyo, Japan

[73] Assignee: Fuji Zerox Co., Ltd., Tokyo, Japan

[21] Appl. No.: 413,392

[22] Filed: Sep. 27, 1989

[30] Foreign Application Priority Data

Sep. 29, 1988 [JP] Japan .................. 63-245343

[51] Int. Cl.$^5$ .............................. G06F 15/38
[52] U.S. Cl. .................................... 364/419
[58] Field of Search ......................... 364/419

[56] References Cited

U.S. PATENT DOCUMENTS

| | | | |
|---|---|---|---|
| 4,218,760 | 8/1980 | Levy | 364/419 X |
| 4,742,481 | 5/1988 | Yoshimura | 364/419 X |
| 4,843,389 | 6/1989 | Lisle et al. | 364/900 X |

FOREIGN PATENT DOCUMENTS

0180360 8/1986 Japan .
0208919 8/1988 Japan .

Primary Examiner—Dale M. Shaw
Assistant Examiner—Xuong Chung
Attorney, Agent, or Firm—Spensley Horn Jubas & Lubitz

[57] ABSTRACT

An electronic apparatus at least has a structure in which plural kinds of dictionary cards, such as Japanese-English, Japanese-Japanese, Chinese characters and the like, are mounted all together. In this electronic dictionary apparatus, in accordance with the input of a header entry for dictionary retrieval via input means, such as a keyboard and the like, a sequential inquiry according to the header entry is performed for all dictionary cards connected to a bus line for automatic retrieval of possible dictionary data corresponding to the input header entry among the plural dictionary cards, dictionary data corresponding to the input header entry are sequentially specified, and all the specified dictionary data are visually displayed on a proper display unit. This electronic dictionary apparatus includes capability for storing identifying information transferred from the connected dictionary cards in table-format, enabling retrieval of passible dictionary data corresponding to the input header entry.

5 Claims, 4 Drawing Sheets

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 00: FOR EXTENSION<br>01: TYPE 1<br>10: TYPE 2<br>11: TYPE 3 | | LANGUAGE CLASSIFICATION<br>(DIFFERENCE IN CONSULTATION) | | | | | INDIVIDUAL CARD ID | | | | | | | | |

FIG. 3

| SLOT NO. | IDENTIFYING INFORMATION |
|---|---|
| 1 | 0 1 0 0 0 1 1 0 1 1 0 0 1 0 1 1 |
| 2 | 1 0 0 0 1 0 1 0 0 0 0 0 0 1 1 0 |
| 3 | 1 0 0 0 0 1 1 0 0 0 0 0 1 0 0 0 |
| 4 | 1 0 0 0 0 1 1 0 0 0 0 0 1 0 0 1 |
| 5 | 1 1 0 0 0 1 1 0 0 0 1 1 1 0 0 1 |
| ⋮ | ⋮ |
| 9 | 1 0 0 0 0 1 1 0 0 0 0 1 1 1 1 0 |

FIG. 4

PLURAL DICTIONARY APPARATUS WITH AUTOMATIC RETRIEVAL FROM MORE THAN ONE PLUG-IN IC DICTIONARY CARD

BACKGROUND OF THE INVENTION

1. Field of the Invention

This invention relates to an electronic dictionary apparatus which provides dictionaries of English-Japanese, Japanese-English, English-English, Japanese-Japanese, Chinese-Japanese, synonyms and the like in IC cards, and which can electronically perform retrieval of these dictionaries via a keyboard and a display unit.

2. Description of the Related Art

There have already been known apparatuses which electronically process various kinds of dictionaries used in learning or daily business in the manner as described above.

In such an electronic dictionary apparatus, the above-described dictionaries provided in IC cards (termed hereinafter dictionary cards) are in general incorporated or removably included within the main frame of the apparatus provided with a keyboard, a display unit and the like. When there are plural kinds of dictionary cards corresponding to the above-described plural kinds of dictionaries, the apparatus is configured so that these dictionary cards are arbitrarily selected to be used in accordance with their applications.

That is, when plural kinds of dictionary cards are used as described above, in an apparatus in which a certain dictionary card has previously been incorporated, other dictionary cards can be externally connected as options via a proper connection apparatus, and it is possible to properly assign whether a dictionary card desired to be used is the incorporated dictionary card or a card externally connected as an option via a key operation and the like. On the other hand, in an apparatus in which all dictionary cards are removably connected to the main frame, the selection and assignment of a dictionary card desired to be used are directly performed in accordance with the loading and unloading of each of these dictionary cards.

In each of these apparatuses, a process procedure corresponding to the assignment of a dictionary card desired to be used as described above is usually determined via an arithmetic unit (MPU) disposed as a retrieval means of these dictionary cards within the main frame, and dictionary data corresponding to a header entry desired to be retrieved occasionally key-input among a group of dictionary data previously registered in these dictionary cards are retrieved and specified. The specified dictionary data are displayed in a predetermined manner via a display unit of the main frame.

In such a conventional electronic dictionary apparatus, even when plural kinds of dictionary cards are prepared, the apparatus is configured so that a flexible utilization of the dictionary cards by the common main frame can be performed by means of arbitrarily using the dictionary cards as described above. However, the following inconveniences, for example, cannot be neglected.

(1) A dictionary card corresponding to an object and an application must be selected every time and mounted to the main frame. Accordingly, even when it is intended to retrieve a related word, meaning and the like using related dictionaries, for example, a Chinese-Japanese dictionary and Japanese-Japanese dictionary, a Japanese-Japanese dictionary and a Japanese-English dictionary, or the like, it is necessary to reload one by one a dictionary card corresponding to each of these dictionaries, and perform every time a key input a header entry desired to be retrieved.

(2) Even in an apparatus to which plural dictionary cards are simultaneously connected (for example, in a case in which a certain dictionary card has previously been incorporated, and other dictionary cards are further optionally connected to the apparatus, as described above), it is necessary to clearly assign every time which dictionary card is to be retrieved via a key operation and the like in performing the retrieval of the dictionary cards. Furthermore, even if these plural dictionary cards are those of related dictionaries as described above, it is usual to have to input a header entry desired to be retrieved every time after the assignment of the dictionary card to be used (to be retrieved).

(3) The storage of dictionary cards which are not used, that is, not mounted to the main frame among plural dictionary cards prepared is troublesome.

SUMMARY OF THE INVENTION

The present invention has been made taking into consideration such circumstances of electronic dictionary apparatuses.

It is an object of the present invention to provide an electronic dictionary apparatus which can dissolve the above-described inconveniences and intend a reasonable and highly effective utilization of dictionary cards, especially when plural kinds of dictionary cards are used.

In the present invention, the above-described main frame has a configuration capable of holding plural kinds of dictionary cards having different applications in the aggregate. Furthermore, in accordance with the input of a header entry desired to be retrieved via an input means, such as a keyboard and the like, the above-described retrieval means performs a sequential inquiry according to the header entry for all dictionary cards which possibly have dictionary data corresponding to the input header entry among the above-described plural dictionary cards held all together, sequentially specifies dictionary data corresponding to the input header entry according to a response from each of these dictionary cards. The main frame also includes a display unit which visually displays all of the input header entry and sequentially-specified dictionary data.

According to the above-described configuration of the main frame relative to dictionary cards, operations, such as every unloading and exchange of plural dictionary cards relative to the main frame, are at least omitted. Furthermore, by the sequential inquiry in the aggregate and specifying operation of the above-described retrieval means for the plural dictionary cards, it is possible to automatically obtain plural kinds of dictionary data (retrieval items of dictionaries) relating to the header entry by performing only one input operation relative to the header entry desired to be retrieved. That is, these features indicate that, when the above-described plural dictionary cards held all together are those of mutually-related dictionaries having an identical way of consultation, for example, dictionaries of Japanese-English, Japanese-Japanese, Chinese characters and the like, by performing one input operation of header characters desired to be retrieved which are expressed by the "hiragana" or "katakana", that is, without assigning a dictionary every time or repeating such a character input operation, the "spelling of the proper header entry in English (English characters)", the "meaning of the proper header entry", the "spelling of the proper header entry in Chinese characters" and the like are automatically displayed on a display unit.

According to the electronic dictionary apparatus of the present invention, it is possible to perform a useful dictionary retrieval which reasonably and highly efficiently utilizes plural dictionary cards corresponding to plural kinds of dictionaries through a very simple input operation.

BRIEF DESCRIPTION OF THE DRAWINGS

FIG. 3 is a schematic diagram showing a data format of identifying information to be transmitted from the dictionary card to the main frame of the electronic dictionary apparatus shown in FIG. 1 or FIG. 2;

FIG. 4 is a schematic diagram showing an example of the storage structure of each of the above-described identifying information to be registered in a memory of the main frame.

DESCRIPTION OF THE PREFERRED EMBODIMENTS

Figure 1:
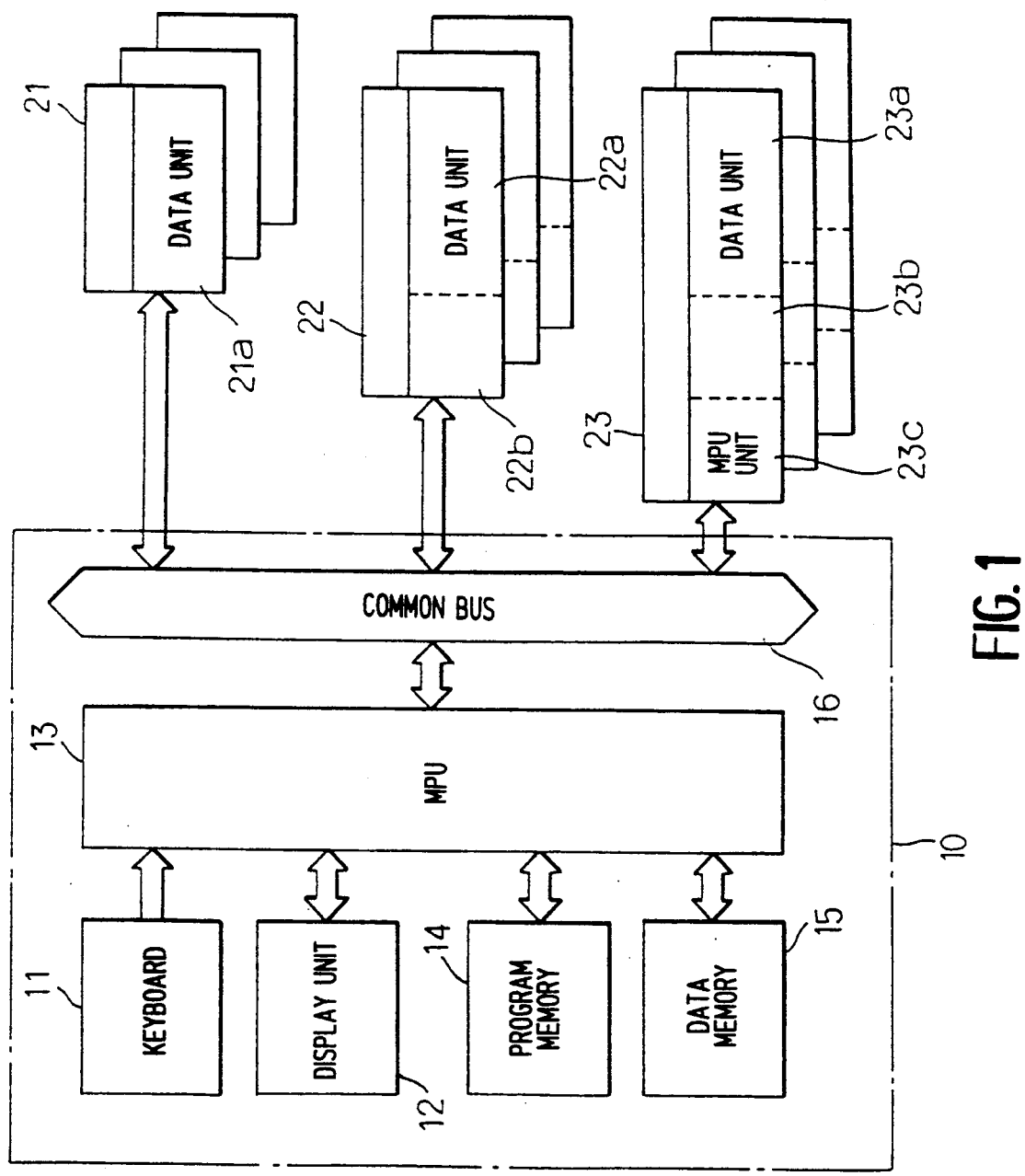
FIG. 1 is a block diagram showing the entire configuration of an embodiment of the electronic dictionary apparatus according to the present invention.
Figure 2:
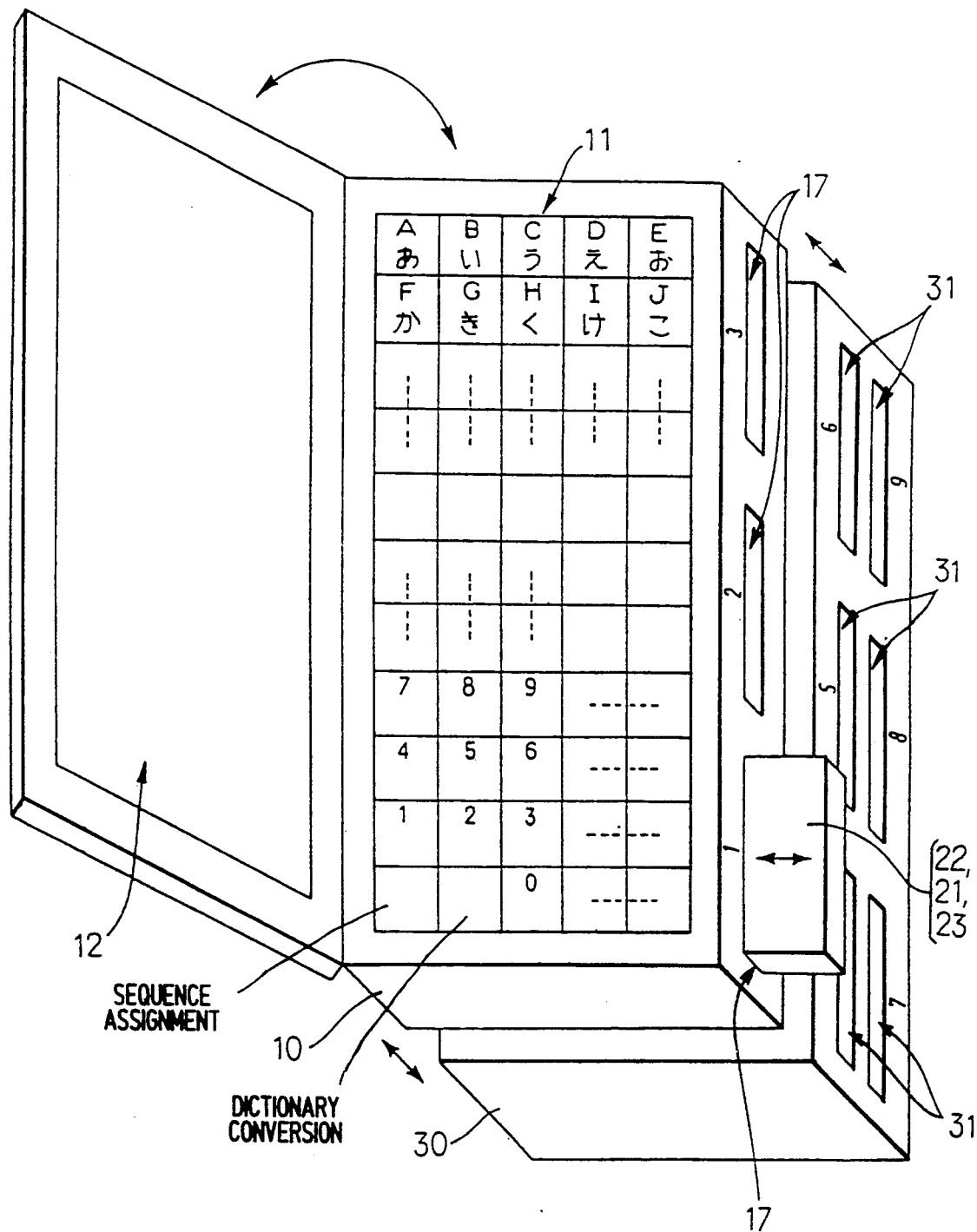
FIG. 2 is a perspective view showing the appearance configuration of the electronic dictionary apparatus shown in FIG. 1.

FIG. 1 shows an electric block configuration of an embodiment of the electronic dictionary apparatus according to the present invention. FIG. 2 shows a rough appearance configuration of the dictionary apparatus of the embodiment.

As shown in FIGS. 1 and 2, the dictionary apparatus of the embodiment comprises two parts in gross, that is, a main frame 10 and dictionary cards 21, 22 and 23.

The main frame 10 comprises a keyboard 11 for mainly key-inputting a header entry desired to be retrieved, a display unit 12 (consisting of, for example, a liquid-crystal display unit) for visually displaying the character string of a header entry key-input via the keyboard 11, the result of retrieval performed via the main frame 10, various kinds of guiding information for operations and the like, an MPU (arithmetic unit) 13 incorporated in the main frame 10 for executing dictionary retrieval processing according to the key-input content while delivering and receiving data with the dictionary cards 21, 22 and 23 bus-line-connected to a common bus 16 in a predetermined aspect which will be described later, and for having display the key-input content, the guiding information for operations, the result of the retrieval and the like on the display unit 12. The main frame 10 also comprises a program memory 14 in which the process procedure of the MPU 13 has previously been registered, a data memory 15 in which delivered and received data, display data for the display unit 12 and the like are temporarily stored while the above-described dictionary retrieval processing by the MPU 13. The dictionary cards 21, 22 and 23 have a structure so that they are mechanically and electrically removably-connected to the main frame 10. The main frame 10 further comprises plural (1st through 3rd pieces, that is, 3 pieces in total in the example of FIG. 2) card slots 17 (FIG. 2) for electrically connecting (bus-line-connecting) the dictionary cards 21, 22 and 23 to a common bus 16 within the main frame 10, when the dictionary cards 21, 22 and 23 are inserted in a predetermined direction and mechanically fitted.

An auxiliary apparatus 30 of the main frame (simply termed hereinafter an auxilliary apparatus) shown in FIG. 2 has a structure so that it is mechanically and electrically removably-connected to the main frame 10 via a proper connector means, and facilitates the card-receiving capacity of the main frame 10 when dictionary cards are added for extension. The auxiliary apparatus 30 is also provided with plural card slots 31 (4th through 9th slots, that is, 6 slots in total in the example of FIG. 2) identical to those described above, and functions so that dictionary cards mounted to these card slots 31 are electrically connected (bus-line-connected) to the common bus 16 within the main frame 10 according to the mounting of the auxiliary apparatus to the main frame 10.

The dictionary cards 21, 22 and 23 are 3 kinds of IC cards having types different from one another (these cards differ only in card configuration, and plural cards corresponding to the above-described plural kinds of dictionaries are prepared for each type). The type-1 dictionary card 21 is an IC card (a so-called ROM card) only consisting of a data unit (a data memory) 21a in which dictionary data corresponding to the above-described dictionaries of English-Japanese, English-English, Japanese-Japanese, Chinese-Japanese, synonyms and the like have previously been registered. The type-2 dictionary card 22 is an IC card consisting of a data unit (a data memory) 22a, in which the dictionary data have previously been similarly registered, and a program unit ( a program memory) 22b, in which a retrieval process procedure peculiar to the proper dictionary card for selecting dictionary data conforming to or having contents close to the inquired header entry among the group of data registered in the data unit 22a has previously been registered. The type-3 dictionary card 23 is an IC card consisting of a data unit (a data memory) 23a, in which the dictionary data have previously been similarly registered, a program unit (a program memory) 23b, in which a retrieval process procedure peculiar to the proper dictionary card for selecting dictionary data conforming to or having contents close to the inquired header entry among the group of data registered in the data unit 23a has previously been registered, and an MPU unit (an arithmetic unit) 23c for starting the program unit 23b in accordance with an inquiry from the MPU 13 of the main frame 10 and for specifying dictionary data selected in accordance with the process procedure of the program unit 23b as dictionary data corresponding to the proper inquired header entry.

In a part of the data unit of each of the dictionary cards 21, 22 and 23, there has previously been written predetermined identifying information indicating own card type (type 1, type 2 or type 3 described above), language classification of dictionary data registered in own data unit (that is, difference in the way of consultation; the method of retrieval (the way of consultation) of a dictionary naturally differs in accordance with a language, such as Japanese, English, German, French and the like), the content of own dictionary (discrimination, such as English-Japanese dictionary, Japanese-English dictionary, English-English dictionary, Japanese-Japanese dictionary and the like). Each dictionary card functions to output the identifying information for the MPU 13 via the common bus 16, when it is electrically connected to the common bus 16 via the card slot 17 of the main frame 10 or the card slot 31 of the auxiliary apparatus 30. An example of data format for such identifying information is shown in FIG. 3.

As shown in FIG. 3, the identifying information consists of the 0th bit-the 15th bit, that is, 16 bit in total. The above-described "card type" is represented by the logical structure of its significant 2 bits, the "language classification (difference in the way of consultation)" is represented by the logical structure of the next 5 bits (the 2nd-the 6th bit), and the "individual-card ID" including the above-described difference in the contents of a dictionary for each card is represented by the logical structure of the remaining 9 bits (the 7th-15th bit). That is, according to the illustrated identifying information, it is possible to identify and assign $2^2$ kinds of types as the "card type", $2^5$ kinds of languages ($2^5$ ways of consultation) as the "language classification (difference in the way of consultation)", and $2^9$ kinds of dictionary cards as the "individual-card ID", respectively. In this embodiment, it is assumed that, relative to the "card type", the 2-bit logical structure "01" represents that the proper dictionary card is the type-1 dictionary card 21, the logical structure "10" represents that the proper dictionary card is the type-2 dictionary card 22, and the logical structure "11" represents that the proper dictionary card is the type-3 dictionary card 23. The logical structure "00" is information for extension allocated to a dictionary card having another type, when this card is further used.

Every time the identifying information is transmitted, the MPU 13, to which the identifying information is thus transmitted, stores the information in the data memory 15 in the form of a table in accordance with the corresponding slot No. (the number of the inserted slot), for example, as shown in FIG. 4, and performs general administration relative to one or plural dictionary cards mounted to the main frame 10 inclusive of the auxiliary apparatus 30.

Owing to such functions of the dictionary cards 21-23 and the MPU 13, the MPU 13 can previously get measures for the following retrieval process for all the dictionary cards mounted, either when the type-1-type-3 dictionary cards 21-23 are mounted with being mixed, or when only plural dictionary cards having a specific type among these cards are mounted, to the above-described card slot 17 or 31 (FIG. 2).

Figure 5:
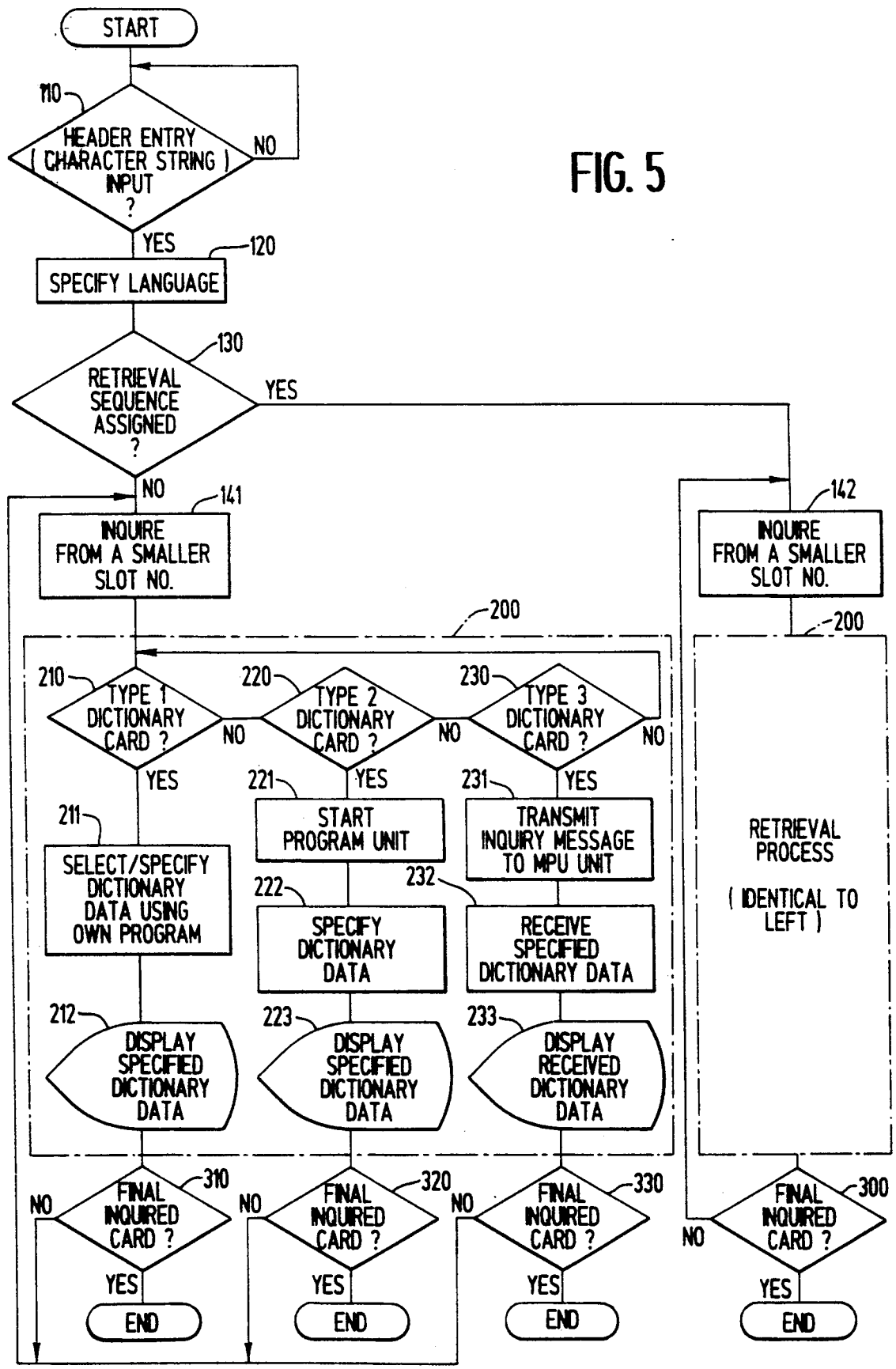
FIG. 5 is a flow chart showing an example of the operation of the electronic dictionary apparatus according to the embodiment.

FIG. 5 shows a concrete example of the retrieval process which the MPU 13 executes according to the process procedure previously stored in the program memory 14 in the dictionary apparatus of the present embodiment. The dictionary retrieval operation of the entire dictionary apparatus of the embodiment will be hereinafter described in detail with reference to FIG. 5.

If it is assumed that power from a power supply (not illustrated) of the main frame 10 has been applied and a header entry (character string) desired to be retrieved has been input via the keyboard 11, in a state in which the mounting of desired plural dictionary cards (irrespective of type 1-type 3) was completed for the card slot 17 of the main frame 10 or the card slot 31 of the auxiliary apparatus 30 mounted and connected whenever necessary, the dictionary apparatus of the embodiment starts and executes dictionary retrieval process in aspects enumerated below.

1) When the MPU 13 determines that the header entry (character string) has been input (step 110 in FIG. 5), it performs display in a predetermined manner via the display unit 12 (illustration in FIG. 5 is omitted), and by referring especially to the column (5 bits) of the "language classification (difference in the way of consultation)" among the identifying information of each mounted dictionary card registered in the above-described identifying-information table (FIG. 4) within the data memory 15, specifies all the dictionary cards which can be consulted (retrieved) by the input header entry, that is, the dictionary cards which have a possibility of having dictionary data corresponding to the input header entry among the mounted dictionary cards (step 120 in FIG. 5). In performing the identification, the MPU 13 discriminates the specified dictionary cards from other dictionary cards by performing processing of, for example, raising a "flag" in a separate storage area corresponding to each registration area for identifying information within the data memory 15 and the like.

2) The MPU 13 then determines whether or not the retrieval sequence for the mounted dictionary cards has previously been assigned (step 130 in FIG. 5). The "assignment of the retrieval sequence" is performed according to the operations of a "sequence-assignment key" and "figure keys" on the keyboard 11 (refer to FIG. 2). When the "sequence-assignment key" is, for example, operated, the operation is subjected to flag registration in a predetermined area within the data memory 15. When the "figure keys" are then operated, the information about numerical values of the operated "figure keys" is sequentially registered in a predetermined area within the data memory 15 in the descending order of the operation as the information corresponding to the numbers of the card slots to which dictionary cards desired to be more quickly retrieved are mounted. According to such registered contents of the data memory 15, the MPU 13 can get the existence of the above-described "assignment of the retrieval sequence" and the "assigned sequence" when the "assignment exists", respectively.

3) When it is determined that the "assignment of the retrieval sequence" has not been performed, the MPU 13 performs inquiry according to the above-described input header entry (character string) sequentially from a dictionary card mounted to a card slot having a smaller slot number among the dictionary cards specified at the process of the above-described step 120 (step 141 in FIG. 5).

4-1) When it is determined that the proper dictionary card as the object of the inquiry is the type-1 dictionary card 21 by referring especially to the column (2 bits) of the "card type" of the identifying information of the dictionary card as the object of the inquiry (step 210 in FIG. 5), the MPU 13 selects dictionary data conforming to or having contents close to the input header entry relative to the proper dictionary card according to the process procedure previously registered in own program, that is, the program memory 14, while performing inquiry according to the input header entry, specifies the selected dictionary data as dictionary data corresponding to the header entry, temporarily stores the data in the data memory 15 (step 211 in FIG. 5), and at the same time displays the specified dictionary data (more exactly, the character string indicated by the data) in a predetermined manner via the display unit 12 (step 212 in FIG. 5). The MPU 13 then refers to the "flag" raised corresponding to the identifying-information table at the preceding step 120. If there exists no other dictionary card as the object of the inquiry, the MPU 13 terminates the retrieval process relative to the proper input header entry. If there exist other dictionary cards as the objects of the inquiry, the process returns to the process at step 141 described in the above-described item 3) (step 310 in FIG. 5). However, when dictionary data which can be specified relative to the input header entry have not been registered in the proper dictionary card, the process shifts to the process at the above-described step 310 according to a response indicating the fact from the proper dictionary card.

4-2) When it is determined that the proper dictionary card as the object of the inquiry is the above-described type-2 dictionary card 22 by referring especially to the column of the "card type" of the identifying information of the dictionary card as the object of the inquiry (step 220 in FIG. 5), the MPU 13 starts the program unit 22b of the dictionary card 22 (step 221 in FIG. 5), specifies dictionary data corresponding to the input header entry according to a response of dictionary data selected in accordance with the above-described process procedure, temporarily stores the data in the data memory 15 (step 222 in FIG. 5), and at the same time displays the specified dictionary data in a predetermined manner via the display unit 12 (step 223 in FIG. 5). The MPU 13 then refers to the "flag" raised corresponding to the above-described identifying-information table at the preceding step 120. If there exists no other dictionary card as the object of the inquiry, the MPU 13 terminates the retrieval process relative to the input header entry. If there exist other dictionary cards as the objects of the inquiry, the process returns to the process of step 141 described in the preceding item 3) (step 320 in FIG. 5). However, when dictionary data which can be specified relative to the input header entry have not been registered in the proper dictionary card, the process returns to the process of the above-described step 320 according to a response indicating the fact from the proper dictionary card.

4-3) When it is determined that the proper dictionary card as the object of the inquiry is the above-described type-3 dictionary card 23 by referring especially to the column of the "card type" of the identifying information of the dictionary card as the object of the inquiry (step 230 in FIG. 5), the MPU 13 transmits an inquiry message according to the input header entry to the program unit 23c of the dictionary card 23 (step 231 in FIG. 5), receives specified dictionary data via the program unit 23c, temporarily stores the data in the data memory 15 (step 232 in FIG. 5), and at the same time displays the received dictionary data in a predetermined manner via the display unit 12 (step 233 in FIG. 5). The MPU 13 then refers to the "flag" raised corresponding to the above-described identifying-information table at the preceding step 120. If there exists no other dictionary card as the object of the inquiry, the MPU 13 terminates the retrieval process relative to the proper input header entry. If there exist other dictionary cards as the objects of the inquiry, the process returns to the process at sep 141 described in the above-described item 3) (step 330 in FIG. 5). However, when dictionary data which can be specified relative to the input header entry have not been registered in the proper dictionary card, the process shifts to the process of the above-described step 330 according to a response indicating the fact from the proper dictionary card.

When it is determined that the "assignment of the retrieval sequence" has been performed at the process of the above-described step 130, the MPU 13 performs inquiry according to the input header entry sequentially from a dictionary card having a smaller number in the "assignment sequence" registered in the data memory 15 via the "sequence-assignment key" and the "figure keys" (step 142 in FIG. 5). The retrieval process procedure for each card type in this inquiry is identical to the procedure described in items 4-1)–4-3) (refer to step 200 and step 300 (steps 310-330) in FIG. 5).

By repeatedly executing such a retrieval process by the MPU 13 as often as the number of dictionary cards specified at the process of step 120, plural dictionary items (character strings indicated by dictionary data) for each dictionary data retrieved and specified corresponding to the input header entry are sequentially and automatically displayed on the display unit 12. The display control is performed in accordance with the display capacity of the display unit 12. When the display capacity is small, the display items for each dictionary data are alternately displayed. When the display capacity is large, it is possible to display all the display items for each dictionary data or each of their divided sections all together.

As described above, according to the dictionary apparatus of the present embodiment, by performing only one input operation relative to a header entry desired to be retrieved, it becomes possible to automatically obtain plural kinds of dictionary items relating to the header entry. When the above-described dictionary cards mounted are those of mutually-related dictionaries having an identical way of consultation, such as Japanese-English, Japanese-Japanese, Chinese characters and the like, by performing only one input operation of header characters desired to be retrieved according to the "hiragana" or "katakana", that is, without a need for assigning a dictionary every time or repeating such a character input operation, "spelling in English (English characters) of the header entry", "meaning of the header entry", "spelling in Chinese of the header entry" and the like are automatically displayed on the display unit.

In the above-described embodiment, every time the MPU 13 specifies dictionary data corresponding to the input header entry, dictionary items (character strings) indicated by the specified dictionary data are also automatically displayed on the display unit 12. Accordingly, aside from a case in which all the dictionary items are displayed all together, when each dictionary item is alternately displayed as described above, it is preferable that the display time for each display item is properly adjusted using a proper timer means (usually incorporated in the MPU 13), or a "dictionary-conversion key" is provided on the keyboard 11 (refer to FIG. 2) and the display item is alternately displayed in accordance with the operation of the key.

Furthermore, although, in the present embodiment, an apparatus capable of properly dealing with even a case in which plural types (for example, 3 types, that is, type 1–type 3) of dictionary cards are mounted with being mixed has been illustrated, the electronic dictionary apparatus according to the present invention is, of course, not limited to such a configuration. That is, the apparatus may have a configuration capable of dealing with only a dictionary card having a specific type among the above-described type 1–type 3. Even in such a configuration, the situation remains unchanged in that troublesome operations, such as dictionary assignment at every time and repeated input of a header entry desired to be retrieved, are not required, and plural kinds of dictionary items relating to the input header entry can automatically be obtained according to only one input operation of the header entry. In this case, the column of the "card type" (significant 2 bits) becomes unnecessary for the above-described identifying information (refer to FIG. 3) transmitted to the main frame 10 (the MPU 13) from each dictionary card, and process procedure data relative to dictionary cards other than the adopted card type also become unnecessary in the process procedure data (refer to FIG. 5) to be registered in the program memory 14.

Furthermore, although, in the above-described embodiment, the apparatus has a configuration in which all the dictionary cards are removably mounted to the main frame 10, the apparatus may have a configuration in which some of the main dictionary cards have previously been incorporated within the main frame 10. In this case, the contents of these incorporated dictionary cards have previously been apparent, and hence it is unnecessary to transmit the above-described identifying information from these dictionary cards.

It is to be noted that the electronic dictionary apparatus according to the present invention can be utilized not only independently by itself, but also in combination with other apparatuses. If the dictionary apparatus is, for example, connected to a personal computer and a word processor via an interface, such as RS-232C and the like, it becomes also possible to intend further effective applications of the mutually connected apparatuses, such as inputting a dictionary card input and retrieved via the dictionary apparatus to the personal computer and the word processor, or retrieving items input to the personal computer and the word processor by the dictionary apparatus, and the like.

What is claimed is:

1. An electronic dictionary apparatus comprising:
   plural dictionary cards at least comprising data memory means in which respective dictionary data groups have previously been registered for plural dictionaries having different applications;
   input means for inputting a header entry desired to be retrieved;
   retrieval means for performing a sequential inquiry according to the header entry for all dictionary cards which have a possibility of having dictionary data corresponding to said input header entry among said plural dictionary cards in accordance with the input of said header entry, and sequentially specifying dictionary data corresponding to said input header entry according to a response from each dictionary card, said retrieval means including memory-table means for storing the transferred identifying information as a table, and performing a retrieval about the existence of dictionary cards which have a possibility of having dictionary data corresponding to said input header entry according to the stored identifying information; and
   display means for visually displaying said input header entry and the sequentially specified dictionary data, wherein
   said plural dictionary cards are individually and removably connected to said retrieval means via a bus line, and said connected dictionary cards previously transfer identifying information relative to own cards to said retrieval means via said bus line.

2. An electronic dictionary apparatus according to claim 1, wherein
   said dictionary cards only consist of data memory means in which said dictionary data groups have previously been registered, and wherein
   said retrieval means selects dictionary data which conform to or have contents close to said input header entry relative to each dictionary card as an object of inquiry by own process procedure while performing said inquiry, and specifies dictionary data by this selection to display on said display means.

3. An electronic dictionary apparatus according to claim 1, wherein
   said dictionary cards comprise data memory means in which said dictionary data groups have previously been registered, and program memory means in which a retrieval process procedure peculiar to the proper dictionary card for selecting dictionary data conforming to or having contents close to the inquired header entry from data groups registered in the data memory means has previously been registered, and wherein
   said retrieval means starts the program memory means, and specifies dictionary data by a response of dictionary data selected in accordance with the process procedure to display on said display means.

4. An electronic dictionary apparatus according to claim 1, wherein
   said dictionary cards comprise data memory means in which said dictionary data groups have previously been registered, program memory means in which a retrieval process procedure peculiar to the proper dictionary card for selecting dictionary data conforming to or having contents close to the inquired header entry from data groups registered in the data memory means, and arithmetic means for starting the program memory means in accordance with an inquiry from said retrieval means and specifying dictionary data selected in accordance with the process procedure as dictionary data corresponding to the inquired header entry, and wherein
   said retrieval means performs said inquiry for the arithmetic means and specifies dictionary data by a response of the dictionary data specified via the arithmetic means to display on said display unit.

5. An electronic dictionary apparatus according to claim 1, wherein
   said dictionary cards consist of
   a first dictionary card only consisting of data memory means in which said dictionary data groups have previously been registered,
   a second dictionary card comprising data memory means in which said dictionary data groups have previously been registered, and program memory means in which a retrieval process procedure peculiar to the proper dictionary card for selecting dictionary data conforming to or having contents close to the inquired header entry from the data groups registered in the data memory means has previously been registered, and
   a third dictionary card comprising data memory means in which said dictionary data groups have previously been registered, program memory means in which a retrieval process procedure peculiar to the proper dictionary card for selecting dictionary data conforming to or having contents close to the inquired header entry from the data groups registered in the data memory means has previously been registered, and arithmetic means for starting the program memory means in accordance with an inquiry from said retrieval means and specifying dictionary data selected in accordance with the process procedure as dictionary data corresponding to the inquired header entry, and at least two kinds of dictionary cards among these dictionary cards are connected to said retrieval means with being mixed via a bus line, and transfer said identifying information including information indicating the kinds of these cards to said retrieval means, respectively, and wherein said retrieval means, when the dictionary card performing said inquiry is said first dictionary card, selects dictionary data conforming to or having contents close to said input header entry relative to the object dictionary card by own process procedure while performing said inquiry, and specifies dictionary data by this selection to display on said display means, when the dictionary card performing said inquiry is said second dictionary card, starts said program memory means thereof, and specifies dictionary data by a response of dictionary data selected in accordance with its process procedure to display on said display means, and when the dictionary card performing said inquiry is said third dictionary card, performs said inquiry for said arithmetic means thereof, and specifies dictionary data by a response of dictionary data specified via the arithmetic means to display on said display means.

* * * * *